United States Patent [19]

Hayamizu

[11] 4,291,945
[45] Sep. 29, 1981

[54] PENTAGONAL ROOF PRISM FOR VIEWFINDER

[75] Inventor: Yoshisada Hayamizu, Hachioji, Japan

[73] Assignee: Olympus Optical Co., Ltd., Japan

[21] Appl. No.: 134,203

[22] Filed: Mar. 26, 1980

[30] Foreign Application Priority Data

Jun. 12, 1979 [JP] Japan .................. 54/73841

[51] Int. Cl.³ .............................. G02B 5/04
[52] U.S. Cl. .................. 350/286; 350/413; 354/155; 354/225
[58] Field of Search .............. 354/155, 199–201, 354/225; 350/286, 175 GN, 413

[56] References Cited

U.S. PATENT DOCUMENTS

| 3,182,576 | 5/1965 | Papke | 354/155 |
| 3,486,808 | 12/1969 | Hamblen | 350/175 GN |
| 4,206,991 | 6/1980 | Kobori et al. | 354/155 X |

Primary Examiner—F. L. Evans
Attorney, Agent, or Firm—Ostrolenk, Faber, Gerb & Soffen

[57] ABSTRACT

A pentagonal roof prism for a viewfinder has a portion adjacent to its surface of incidence which has a non-homogeneous distribution of refractive indices, whereby said portion serves as a convex lens.

5 Claims, 9 Drawing Figures

PENTAGONAL ROOF PRISM FOR VIEWFINDER

BACKGROUND OF THE INVENTION

The invention relates to a pentagonal roof prism for a viewfinder, and more particularly, to such a prism for a viewfinder which is used in a single lens reflex camera or other optical instruments.

A single lens reflex camera or other optical instruments incorporate a variety of viewfinders which are sophisticated in one way or another in order to reduce the overall size, to facilitate the manufacture or to reduce the manufacturing cost.

As is well recognized, a single lens reflex camera includes an optical system for its viewfinder which is constructed as illustrated in FIG. 1. Referring to FIG. 1, light 7 from an object being photographed which is passed through a lens 1 is reflected upward by a movable reflecting mirror 5 to be focused onto a focusing screen 2, disposed at a point which is conjugate to the focal plane of the lens 1, as an erect image which is laterally reversed. The image formed on the focusing screen 2 can be viewed through an eyepiece 8, pentagonal roof prism 4 (which will be hereafter referred to as a pentaprism) and a field lens 3. The pentaprism 4 causes the image to be reflected twice by its reflecting surfaces, including the top surface, to return the optical axis to a horizontal path and reversing the lateral side, thus producing an erect image with correct lateral orientation. Hence, the erect image can be viewed through the eyepiece 8.

In FIG 1, the distance between the optical axis $1a$ of the lens 1 and the top apex $4a$ of the pentaprism 4 is designated by character D, and it is known that a compact single lens reflex camera having a reduced overall size can be produced by arranging an optical system for the viewfinder in which the distance D is minimized. At this end, the field lens 3 is formed integrally with the bottom surface $4b$ of the pentaprism 4, thus reducing the magnitude of distance D by an amount equal to the separation which was originally present between the pentaprism 4 and the field lens 3. However, this is insufficient, and there is still a strong desire for a further reduction in size. In addition, the presence of the convex surface of the field lens 3 intermediate the focusing screen 2 and the field lens 3 requires a definite spacing therefor. A further improvement is required in this region to reduce the distance D to a lesser value.

SUMMARY OF THE INVENTION

It is an object of the invention to provide a pentagonal roof prism for a viewfinder which is formed with a non-homogeneous distribution of refractive indices in its bottom which is located adjacent to a focusing screen, thereby providing an additional function of a convex lens to achieve a further reduction in size.

In accordance with the invention, the pentaprism has a lower surface which remains planar in configuration while functioning as a convex lens. This permits the use of a field lens to be omitted, enabling a reduction in the size as well as the cost of the viewfinder which is used in a photographing camera or other optical instruments.

DESCRIPTION OF PREFERRED EMBODIMENTS

Figure 1:
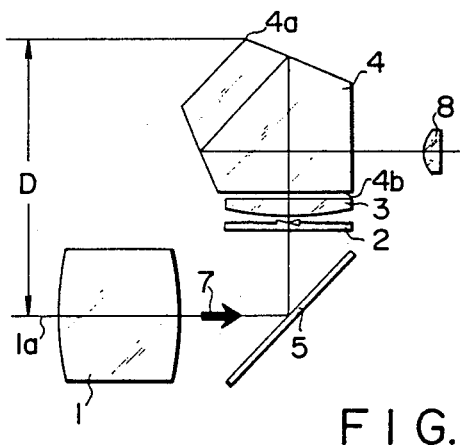
FIG. 1 is a schematic diagram of an optical system for a viewfinder of a single lens reflex camera in which a conventional pentaprism is used.
Figure 2:
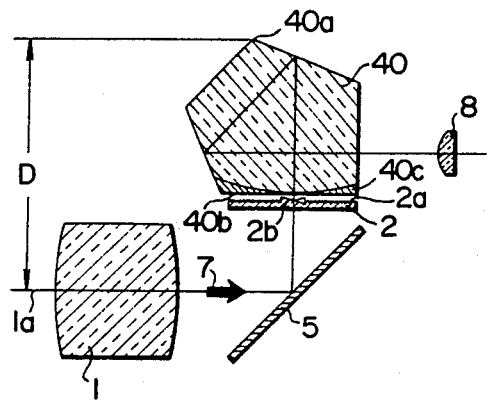
FIG. 2 is a cross section of a pentaprism according to one embodiment of the invention which is utilized as an optical system for the viewfinder of a single lens reflex camera.

Referring to FIG. 2, there is shown an optical system for the viewfinder of a single lens reflex camera in which a pentaprism 40 according to the invention is incorporated. The optical system is generally similar to that shown in FIG. 1, and includes a lens 1, a movable reflecting mirror 5, a focusing screen 2, the pentaprism 40 and an eyepiece 8. It will be understood that corresponding parts are designated by like reference characters as used in FIG. 1.

In accordance with the invention, the pentaprism 40 has a portion $40c$, shown hatched, in a region adjacent to the surface of incidence located close to the focusing screen 2 and which has a non-homogeneous distribution of refractive indices, in contradistinction to the pentaprism 4 shown in FIG. 1, for example. The portion $40c$ functions as a convex lens. Since the portion $40c$ serves the function of the field lens 3 shown in FIG. 1, the field lens can be dispensed with in the viewfinder system of FIG. 2 using the pentaprism 40 which is provided with the portion $40c$. It is to be noted that the lower surface of the portion $40c$ having the non-homogeneous distribution of refractive indices is planar in configuration. This permits the lower surface $40b$ to be located very close to the focusing screen 2. In this manner, the distance D between the optical axis $1a$ of the lens 1 and the top apex $40a$ of the pentaprism 40 can be substantially reduced.

Figure 3:
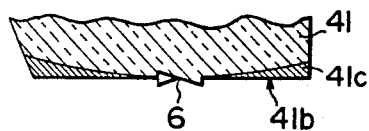
FIG. 3 is a fragmentary cross section of a pentaprism according to another embodiment of the invention.

FIG. 3 is a fragmentary section of a pentaprism 41 according to another embodiment of the invention. It is to be understood that in the viewfinder system of FIG. 2, the upper surface of the focusing screen 2 is formed with a Fresnel lens $2a$ which is in turn centrally formed with a microprism $2b$. As is well recognized, the purpose of the Fresnel lens $2a$ is to enable a light image which is focused the focusing screen 2 to be clearly viewed up to its marginal area. The microprism $2b$ is provided to enable a high precision focusing operation, and includes a plurality of fine prisms thereon. The pentaprism 41 shown in FIG. 3 has the combined function of the focusing screen 2 shown in FIG. 2. Specifically, the pentaprism 41 comprises a portion $41c$ located adjacent to its lower surface $41b$ and which has a non-homogeneous distribution of refractive indices to serve as a convex lens, and the microprism 6 is formed centrally therein. When the pentaprism 41 is used to form an optical system for the viewfinder of a single lens reflex camera, for example, the focusing screen is defined by the lower surface $41b$ of the pentaprism 41 with the focusing microprism 6 located centrally therein. As with the pentaprism 40 shown in FIG. 1, the function of the field lens which serves as a convex lens is formed by the portion 41c of the pentaprism 41 which is provided adjacent to the lower surface thereof and which has the non-homogeneous distribution of refractive indices. The Fresnel lens 2a formed on the upper surface of the focusing screen 2 of FIG. 2 can be dispensed with, since the lower surface of the non-homogeneous portion 41c serves the same function. Accordingly, an annular fringe inherent to the use of the Fresnel lens is avoided, improving the sight obtained through the viewfinder.

Since the pentaprism 41 has the functions of the field lens and focusing screen combined therewith, these members can be dispensed with. Hence, if the pentaprism 41 is used to form an optical system for the viewfinder, the distance D can be further reduced. Though the reduced size of the microprism usually make its manufacture difficult, the pentaprism 41 can be molded from a synthetic resin, so that the microprism which is to be formed on the pentaprism can be integrally molded, thus facilitating its manufacture.

Figure 4:
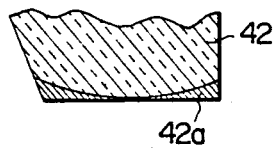
FIGS. 4 and 5 are cross sections illustrating parts of the pentaprism of the invention which have a non-homogeneous distribution of refractive indices formed adjacent to its surface of incidence.
Figure 5:
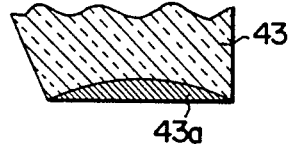

Referring to FIGS. 4 and 5, the portion of the pentaprism having the non-homogeneous distribution of refractive indices and which serves as a convex lens will be more closely considered. FIG. 4 shows a pentaprism 42 which is provided with a portion 42a adjacent to its lower surface which has a non-homogeneous distribution of refractive indices in a region which is shaped like a concave lens. The portion 42 is manufactured such that the distribution of refractive indices is shaped such that the refractive index increases with the distance from the lower surface of the prism. In this manner, the portion 42a serves as a convex lens.

FIG. 5 shows a pentaprism 43 having a portion 43a adjacent to its lower surface which is shaped like a convex lens and which has a non-homogeneous distribution of refractive indices. The portion 43a is manufactured so that the distribution therein is such that the refractive index decreases with distance from the lower surface of the prism. In this manner, it serves as a convex lens.

Figure 6A:
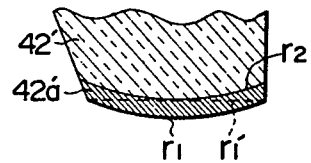
FIGS. 6(A) and (B) and 7(A) and (B) are fragmentary cross sections of the prism of the invention, illustrating the techniques utilized to form a non-homogeneous distribution of refractive indices.
Figure 6B:
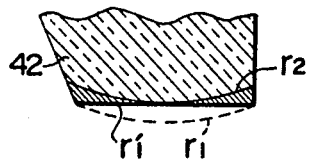

A method of forming a portion of a pentaprism which has a non-homogeneous distribution of refractive indices will now be described with reference to FIGS. 6 and 7. FIGS. 6(A) and (B) illustrate a method to form the portion 42a of the pentaprism 42 shown in FIG. 4. In this instance, a pentaprism 42' having a convex lower surface is initially formed, as shown in FIG. 6(A). A region adjacent to the convex lower surface is chemically treated in a manner known in itself so as to produce a refractive index which gradually and continuously increases with distance from the lower surface $r_1$, thus providing a region 42'a, shown hatched, extending from the lower surface $r_1$ to an inner boundary surface $r_2$ that extends parallel to the lower surface, and which has a refractive index which gradually increases toward the inner surface $r_2$. When the pentaprism 42' shown in FIG. 6(A) is formed, the lower surface region of the pentaprism 42' may be polished to an inner plane $r_1'$, shown in dotted lines in FIG. 6(A), whereby the pentaprism 42 of the invention can be obtained as indicated in FIG. 6(B).

Figure 7A:
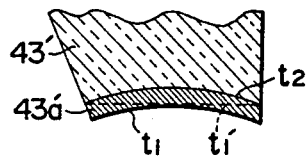
Figure 7B:
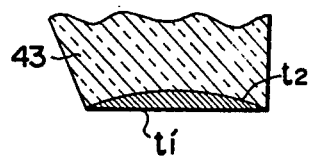

FIGS. 7(A) and (B) illustrate a method to form the portion 43a of the pentaprism 43 shown in FIG. 5. In this instance, a pentaprism 43' having a concave lower surface is initially formed as indicated in FIG. 7(A). A portion of the pentaprism 43' adjacent to the concave lower surface is chemically treated in a known manner to produce a region in which the refractive index which gradually and continuously decreases with distance from the lower surface $t_1$ until an inner boundary surface $t_2$ is reached which extends parallel to the lower surface $t_1$. In this manner, a portion 43'a, shown hatched, is obtained which has a gradually decreasing refractive index toward the interior. When the pentaprism 43' is formed as shown in FIG. 7(A), the lower portion thereof can be polished to an inner plane $t_1'$, which is shown by dotted lines in FIG. 7(A), whereby the pentaprism 43 is completed as shown in FIG. 7(B).

What is claimed is:

1. A pentagonal roof prism for a viewfinder, comprising a pentagonal prism having an apex and a planar surface located opposite said apex, said prism having a region formed therein adjacent said planar surface, said region having a non-uniform index of refraction, said region having a shape which cooperates with said non-uniform index of refraction to cause light passing into said prism through said planar surface to be refracted in the same manner as if said prism had a uniform index of refraction and said surface had a predetermined curvature.

2. A pentagonal roof prism according to claim 1, in which said planar surface is centrally formed with a microprism.

3. A pentagonal roof prism according to claim 1, in which said predetermined curvature is convex toward the exterior of said prism.

4. A pentagonal roof prism according to claim 1, in which said region has an inner boundary separating it from the rest of said prism, said inner boundary being concave toward said rest of said prism, and said non-uniform index of refraction of said region increasing continuously from said planar surface to said inner boundary of said region.

5. A pentagonal roof prism according to claim 1, in which said region has an inner boundary separating it from the rest of said prism, said inner boundary being convex toward said rest of said prism, and said non-uniform index of refraction of said region decreasing continuously from said planar surface to said inner boundary of said region.

* * * * *